A. PRIESTMAN.
METHOD OF TREATING SEWAGE.
APPLICATION FILED MAR. 14, 1911.
1,080,926.
Patented Dec. 9, 1913.
2 SHEETS—SHEET 2.
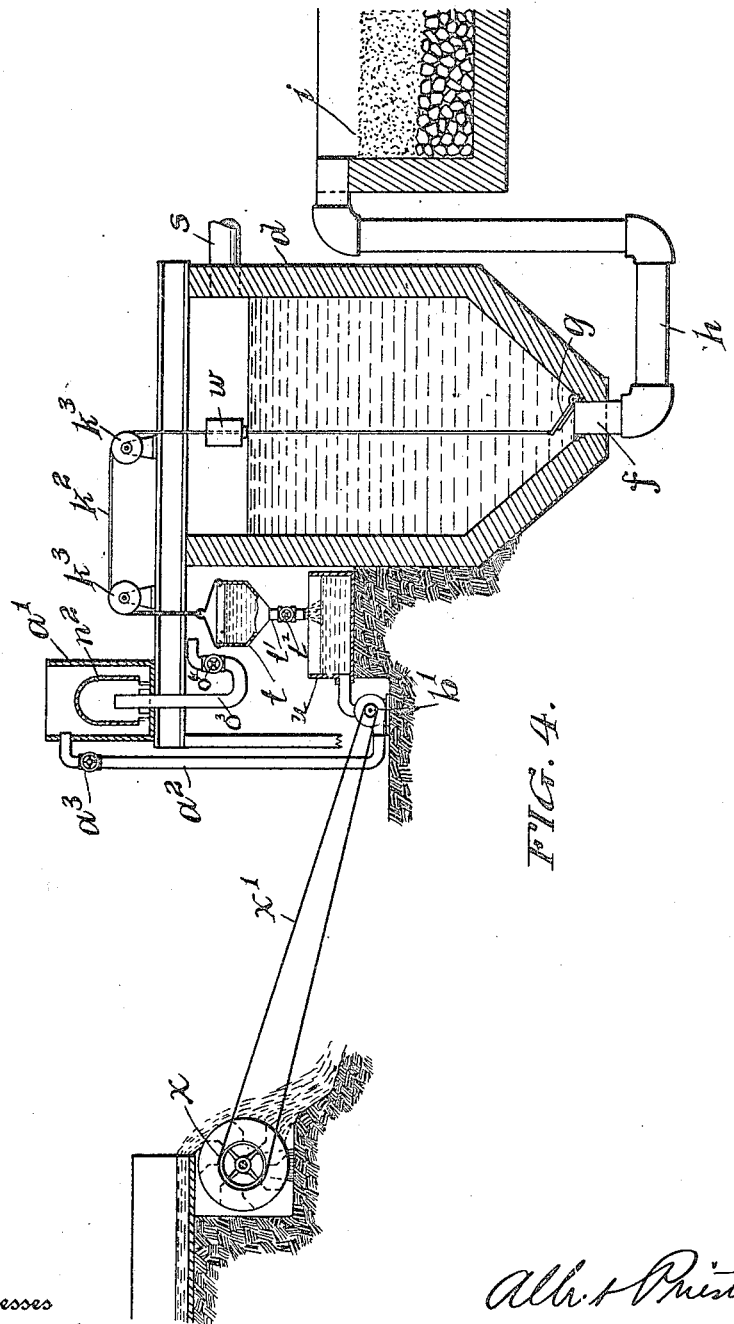
FIG. 4.
Witnesses
Daniel Webster, Jr.
R. M. Kelly
Inventor
Attorney

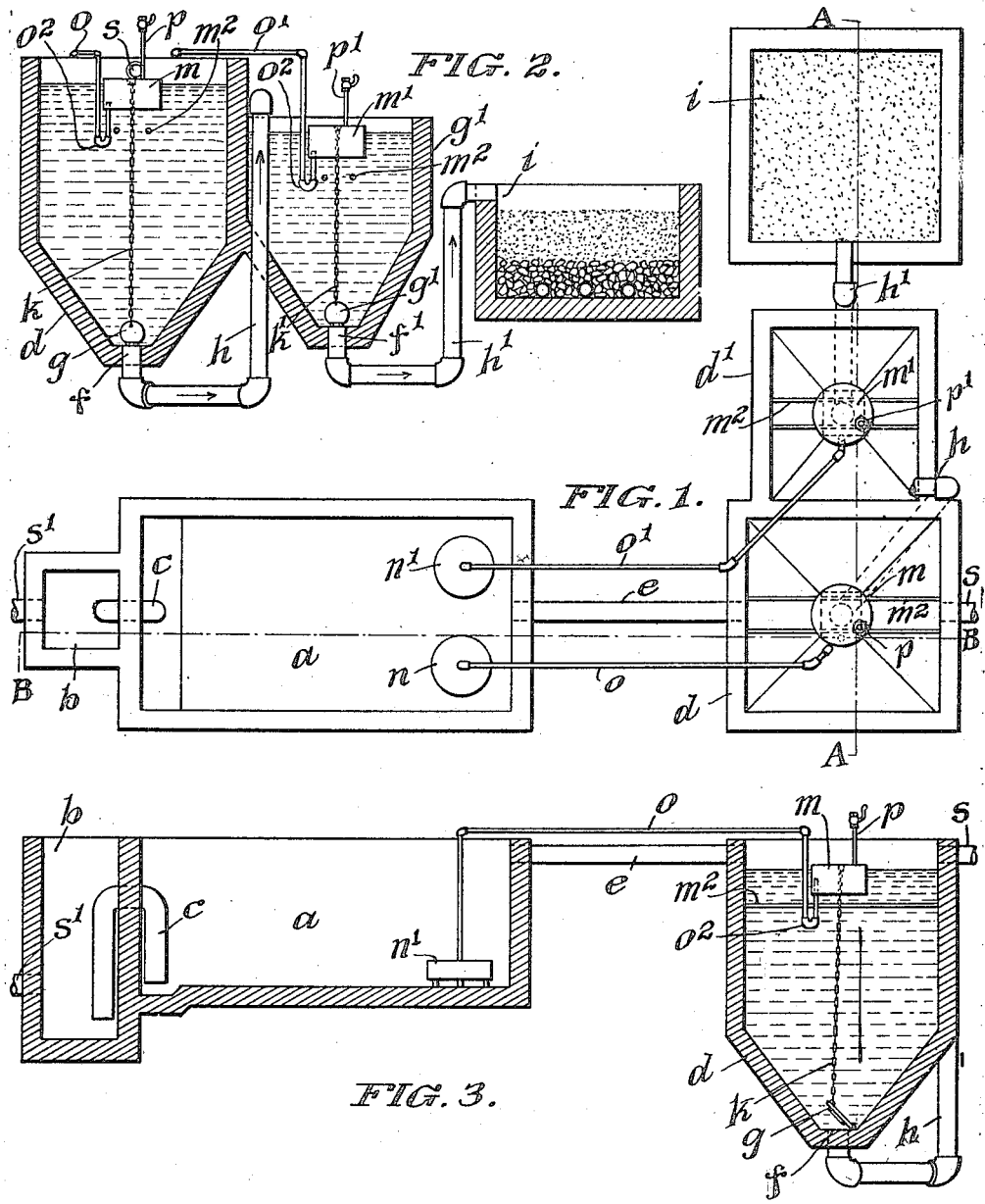

UNITED STATES PATENT OFFICE.

ALBERT PRIESTMAN, OF PHILADELPHIA, PENNSYLVANIA.

METHOD OF TREATING SEWAGE.

1,080,926.  Specification of Letters Patent.  Patented Dec. 9, 1913.

Application filed March 14, 1911. Serial No. 614,811.

*To all whom it may concern:*

Be it known that I, ALBERT PRIESTMAN, a subject of the King of England, and a resident of Germantown, in the city and county of Philadelphia, State of Pennsylvania, have invented an Improvement in Methods of Treating Sewage, of which the following is a specification.

It is well known that while it is possible, under favorable conditions, to oxidize organic matter in solution with great, if not explosive, rapidity, comparatively long periods of time are required for the treatment in contact with bacteria of the matter in suspension.

It is the object of my invention to precipitate the solid matter and to remove the precipitated sludge automatically at determined intervals with a minimum quantity of water. Such removal of the sludge may be effected in volumes proportional to the volume of sewage being treated, and at such intervals as may be desired; for example, that amount of sludge may be automatically removed in a period of twenty four hours which is precipitated in that period from the inflowing sewage being treated. The sludge thus removed is discharged, preferably before putrefactive processes have become active, and a further object of my invention is to subject this sludge to further treatment in a second tank or tanks in which putrefaction takes place, discharging the sludge automatically and at determined intervals in small quantities after putrefactive processes have been active, so that the matter finally discharged upon the sludge bed or elsewhere will be free from offensive gases.

I prefer that the quantities of sludge discharged from the second tank after putrefaction has become active shall be approximately equal to the quantities supplied to it, *i. e.* discharged from the first or precipitating tank. The discharge of the sludge from the tanks may be regulated by any suitable automatic, timed devices; but in the preferred form it is controlled by the overflow of the sewage from the precipitating tank. The discharge of the sludge may thus be regulated to take place at fixed intervals in relation to the flow of the sewage through the apparatus. The period of time during which the valves remain open at each operation may also be regulated automatically, so that they will remain open for a predetermined period in relation to the flow from each tank.

In the drawings: Figure 1 is a plan view of a sewage disposal apparatus embodying the invention; Fig. 2 is a longitudinal vertical sectional view of the same on the line A—A of Fig. 1; Fig. 3 is a similar view on the line B—B; and Fig. 4 is a longitudinal vertical sectional view illustrating an apparatus embodying the invention in another form.

Referring first to the form of apparatus shown in Figs. 1–3: $d$ is a settling-tank to which sewage is supplied at the top through a pipe $s$. This tank is provided at the bottom with an outlet $f$ which is controlled by a valve $g$. $h$ is a discharge pipe leading from the outlet $f$, through which the sludge is discharged. This discharge-pipe $h$ may lead to any tank, bed, apparatus, or place for the further treatment or final disposal of the sludge. In the apparatus shown in Figs. 1–3 it leads to the top of a second tank $d'$, in which putrefactive action takes place. The tank is also provided at the bottom with an outlet $f'$ controlled by a valve $g'$ leading to a pipe $h'$ discharging to the sludge-bed $i$. $e$ is a discharge-pipe or conduit from the top of the tank $d$. In this form of the apparatus, as shown, the valves $g$, $g'$ which control the outlets for the sludge to the discharge-pipes $h$, $h'$ are controlled automatically by the conditions in a tank or reservoir $a$ into which the overflow of the sewage is discharged from the top of the settling-tank $d$ by the pipe or conduit $e$. The valves shown are of the hinged flap-type opening upwardly, and are connected by chains $k$, $k'$ with the floating bells $m$, $m'$ respectively, which are operated from the air-bells $n$, $n'$ in the tank or reservoir $a$ through the air-pipes $o$, $o'$. The air-bells $m$, $m'$ are provided respectively with the valved air-vents $p$, $p'$. $c$ is a siphon by which the contents of the tank or reservoir $a$ are discharged into the chamber $b$, whence they pass out through the pipe $s'$.

The operation of this apparatus is as follows: The sewage enters the tank $d$ through the pipe $s$, and after it has accumulated therein (the valve $g$ being closed), the surface liquid flows off through the pipe or conduit $e$ into the tank or reservoir $a$. When the liquid in the tank $a$ has attained a sufficient level to force enough air through the bell $n$ and pipe $o$ into the floating bell $m$ to lift it, the valve $g$ is opened, and the sludge which has accumulated in the bottom of the tank $d$ is discharged through the outlet $f$ into the pipe $h$. In the apparatus shown the end of the air-pipe $o$ which enters the air-bell $m$ is provided with a U-bend $o^2$ which forms a liquid-seal, so that the bell $m$ and valve $g$ will not be operated until the level in the tank $a$ is sufficient to produce enough pressure in the bell $n$ to force the water-seal $o^2$, and admit to the bell $m$ a charge of air which lifts it and opens the valve $g$. The opening of the valve $g$ thus depends primarily upon the level of the liquid in the reservoir $a$, and as this reservoir is supplied by the overflow of the sewage from the tank $d$, it follows that the intervals at which the valve $g$ will be opened will be regulated according to the flow of sewage to the apparatus; and by the regulation of the supply to the tank $d$, or to the tank $a$, the intervals at which the valve $g$ will be opened may be controlled. The closing of the valve $g$ is controlled by the vent $p$, which permits the air introduced through the pipe $o$ to escape, so that as the air escapes the bell $m$ may fall and close the valve $g$ irrespective of the levels in the tanks $d$ and $a$. This enables the valve $g$ to be kept open for short periods at long intervals, so that only the accumulation of comparatively dense sludge in the bottom of the settling-tank $g$ will be discharged.

In practice, as the sewage enters the tank $d$, the heavier matter in suspension will remain in the settling-tank $d$ while only the comparatively clear liquid will pass off through the discharge pipe or conduit $e$ into the reservoir $a$. There will, however, be no operation of the valve $g$, until such a level has been reached in the reservoir $a$ as will provide the hydrostatic head required to force the liquid-seal in the pipe $o$ and lift the bell $m$. The return of the bell and the closing of the valve $g$ are however controlled by the vent $p$, and may be regulated by the adjustment of the valve in the vent to permit the valve $g$ to remain open for a very short interval of time, only sufficient to effect the discharge of the dense sludge at the bottom of the tank $d$. By a proper adjustment of the vent $p$ the valve may be allowed to remain open for a predetermined period in relation to the flow from the tank, so that an equal quantity of sludge will be discharged each time. Exactly the same operation takes place in the tank $d'$, if it be used. The sludge from the tank $d$ enters the tank $d'$ at the top and accumulates therein until such time as the hydrostatic head in the reservoir $a$ through the bell $n'$ and pipe $o'$ forces the seal $o^2$ and operates the air-bell $m'$ and valve $g'$. The closing of the valve $g'$ is controlled, just as in the case of the valve $g$, by the adjustment of the valve in the vent $p'$. The valve $g'$ is opened at intervals corresponding with those at which the valve $g$ is opened, and the vent $p'$ may be adjusted to permit the valve $g'$ to remain open for the same period as the valve $g$ remains open, consequently the quantities of sludge discharged from the tank $d'$ after putrefactive processes have become active will be the same as the quantities fed to the tank $d'$ from the precipitating tank $d$.

Whenever the liquid in the reservoir $a$ reaches sufficient height to operate the siphon $c$ it passes off through the chamber $b$ and discharge-pipe $s'$. This discharge of the liquid from the reservoir $a$ does not, however, affect the liquid in the settling tanks $d$, $d'$.

$m^2$ are stops in the upper part of the tanks $d$, $d'$ to support the bells $m$, $m'$ when the level of the liquid falls upon the opening of the valves $g$, $g'$.

In the apparatus described the periodic opening of the valve in the settling-tank or tanks is dependent upon the supply of the sewage to the tanks, being controlled by the level of the overflow of the surface liquid from them. This is not however necessary to the invention, and in the apparatus shown in Fig. 4 the valve $g$ is controlled by means independent of the supply of sewage to the tank $d$. In this apparatus the tank $d$ with its outlet $f$, valve $g$ and discharge-pipe $h$ are the same as in the apparatus shown in Figs. 1–3. In this case, however, a settling-tank only is shown and this discharges directly to the sludge-bed $i$. The valve $g$ is connected by a chain or cable $k^2$ running over guides $k^3$ $k^3$ with a suspended vessel $t$ open at the top and provided at the bottom with a valved outlet $t'$ discharging into a tank $u$. The cable $k^2$ is provided with a counterweight $w$ which normally balances the vessel $t$ and permits the valve $g$ to remain closed. $a'$ is an elevated chamber connected with the tank $u$ by a pipe $a^2$ in which is a circulating pump $b'$. $n^2$ is an air-bell in the chamber $a'$, from which a water-sealed pipe $o^3$ leads with its discharge end in position to discharge into the open top of the suspended vessel $t$.

Sufficient liquid is present in the tank $u$ to operate the apparatus. Normally the weight $w$ counterbalances the vessel $t$ and permits the valve $g$ to remain closed. The pump $b$ withdraws liquid from the tank $u$ and supplies it to the chamber $a'$, and when the hydrostatic head in the chamber $a'$ acting through the air-bell $n^2$ is sufficient to force the liquid seal in the pipe $o^3$, liquid will be discharged from the pipe $o^3$ into the open top of the vessel $t$, and when the weight of the liquid in the vessel $t$ is sufficient to overcome the weight of the valve $g$ and its counterweight $w$, the valve $g$, will be opened and sludge will be discharged from the bottom of the tank $d$. The valve $g$ will remain open until the discharge of the liquid through the pipe $t'$ into the tank $u$ reduces the weight of the vessel $t$ and its contained liquid below the weight of the valve and its counterweight. The rate of this discharge, and consequently the period that the valve $g$ will remain open, may be regulated by the adjustment of the valve $t^2$ in the discharge pipe $t'$. The period at which the valve will be operated may be regulated by valves $a^3$ and $o^4$ in the pipes $a^2$ and $o^3$ respectively. The pump $b'$ may be operated in any convenient manner, as by a water-wheel $x$ connected with the pump by belting $x'$ and driven by the incoming sewage, or, preferably, by the filtrate from the apparatus.

In this application I do not claim the apparatus for treating sewage which is herein described and shown, as the same forms the subject matter of my application Ser. No. 701,853, filed June 5, 1912, as a division of this application.

What I claim is as follows:

1. The herein described method of treating sewage to precipitate and remove sludge, which consists in allowing the denser part of the sewage to remain for comparatively long periods in a settling-tank to precipitate the solid matter in suspension, discharging the denser portions of the sludge from the bottom of said portion of the sewage in relatively small quantities at intervals in relation to the flow of the sewage to or from the apparatus, and supplying fresh sewage to the top of such portion.

2. The herein described method of treating sewage to precipitate and remove sludge, which consists in allowing the denser part of the sewage to remain for comparatively long periods in a settling-tank to precipitate the solid matter in suspension, discharging the denser portions of the sludge from the bottom of said portion of the sewage in relatively small uniform quantities at regular intervals in relation to the flow of the sewage to or from the apparatus, and supplying fresh sewage to the top of such portion.

3. The herein described method of treating sewage to precipitate and remove sludge, which consists in allowing the denser part of the sewage to remain for comparatively long periods in a settling-tank to precipitate the solid matter in suspension, discharging the denser portions of the sludge from the bottom of said portion of the sewage in relatively small quantities for equal periods at regular intervals in relation to the flow of the sewage to or from the apparatus, and supplying fresh sewage to the top of such portion.

4. The herein described method of treating sewage, which consists in supplying the sewage to a settling-tank at the top, discharging the denser portions of the sludge in relatively small quantities at intervals from the lower portion of the body of liquid in said tank, and controlling said discharge by the overflow of the sewage from said tank.

5. The herein described method of treating sewage, which consists in allowing the sewage to remain for comparatively long periods in a settling-tank to precipitate the solid matter in suspension, discharging the denser portions of the sludge in relatively small quantities and at intervals from the lower portion of the body of liquid into the top of a second tank, allowing said sludge to remain for comparatively long periods in said second tank, discharging the denser portions in relatively small quantities and at intervals from the lower portion of the sludge in said second tank, and supplying fresh sewage to the upper portion of the liquid in the first tank.

6. The herein described method of treating sewage, which consists in allowing the sewage to remain for comparatively long periods in a tank to precipitate the solid matter in suspension, discharging the denser portions of the sludge from the lower portion of the body of liquid in said tank in relatively small quantities and at intervals into the top of a second tank, and discharging the matter from the bottom of the second tank in relatively small quantities and at intervals after putrefaction has been active.

7. The herein described method of treating sewage, which consists in allowing the sewage to remain for comparatively long periods in a tank to precipitate the solid matter in suspension, discharging the denser portions of the sludge from the lower portions of the body of liquid in said tank, at intervals in relatively small quantities and before putrefactive processes are active, into a second tank, allowing the sludge to remain in said second tank until putrefactive processes have become active in the lower portion thereof, and discharging said lower portion at intervals in relatively small quantities.

8. The herein described method of treating sewage, which consists in allowing the sewage to remain for comparatively long periods in a tank to precipitate the solid matter in suspension, discharging the denser portions of the sludge from the lower portions of the body of liquid in said tank, at intervals in relatively small quantities and before putrefactive processes are active, into a second tank, allowing the sludge to remain in said second tank until putrefactive processes have become active in the lower portion thereof, and discharging said lower portion at intervals in relatively small quantities approximately equal to the quantities supplied from the first tank to said second tank.

9. The herein described method of treating sewage, which consists in allowing the sewage to remain for comparatively long periods in a tank to precipitate the solid matter in suspension, discharging the denser portions of the sludge from the lower portions of the body of liquid in said tank at intervals in relatively small quantities and before putrefactive processes are active, into a second tank, allowing the sludge to remain in said second tank until putrefactive processes have become active in the lower portion thereof, discharging said lower portion at intervals in relatively small quantities, and controlling the discharge from the first tank to the second tank by the overflow of sewage from the first tank.

10. The herein described method of treating sewage, which consists in allowing the sewage to remain for comparatively long periods in a tank to precipitate the solid matter in suspension, discharging the denser portions of the sludge from the lower portions of the body of liquid in said tank, at intervals in relatively small quantities and before putrefactive processes are active, into a second tank, allowing the sludge to remain in said second tank until putrefactive processes have become active in the lower portion thereof, discharging said lower portion at intervals in relatively small quantities, and controlling the discharge from both tanks by the overflow of the sewage from the first tank.

11. The herein described method of treating sewage, which consists in allowing the sewage to remain for comparatively long periods in a settling-tank to precipitate the solid matter in suspension, discharging the denser portions of the sludge in relatively small quantities and at intervals from the lower portion of the body of liquid into the top of a second tank, allowing said sludge to remain for comparatively long periods in said second tank, discharging the denser portions in relatively small quantities and at intervals from the lower portion of the sludge in said second tank, and supplying fresh sewage to the upper portion of the liquid in the first tank, and automatically controlling the discharge of the sludge from both settling-tanks by the overflow of the sewage from the first tank.

In testimony of which invention, I hereunto set my hand.

ALBERT PRIESTMAN.

Witnesses:
R. M. KELLY,
M. G. EGAN.